United States Patent
Murakami et al.

(12) 
(10) Patent No.: US 6,406,626 B1
(45) Date of Patent: Jun. 18, 2002

(54) COMPOSITE SEMIPERMEABLE MEMBRANE, PROCESSFOR PRODUCING THE SAME, AND METHOD OF PURIFYING WATER WITH THE SAME

(75) Inventors: Mutsuo Murakami, Shiga; Yasushi Tateishi, Kyoto; Yoshinari Fusaoka, Shiga, all of (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 09/623,986

(22) PCT Filed: Jan. 14, 1999

(86) PCT No.: PCT/JP99/00115

§ 371 (c)(1),
(2), (4) Date: Sep. 12, 2000

(87) PCT Pub. No.: WO00/41800

PCT Pub. Date: Jul. 20, 2000

(51) Int. Cl.[7] .............................................. B01D 71/56
(52) U.S. Cl. ........................... 210/500.38; 210/500.37; 264/41; 427/244; 427/245
(58) Field of Search ....................... 210/500.38, 500.37, 210/490; 264/41; 427/244, 245

(56) References Cited

U.S. PATENT DOCUMENTS

| | | | |
|---|---|---|---|
| 4,005,012 A | * | 1/1977 | Wrasidlo |
| 4,606,943 A | * | 8/1986 | Rack et al. |
| 4,778,596 A | * | 10/1988 | Linder et al. |
| 5,147,553 A | | 9/1992 | Waite |
| 5,173,191 A | * | 12/1992 | Black |
| 5,614,099 A | * | 3/1997 | Hirose et al. |
| 5,674,398 A | * | 10/1997 | Hirose et al. |
| 5,925,255 A | * | 7/1999 | Mukhopadhy |
| 6,162,358 A | * | 12/2000 | Li et al. |
| 6,171,497 B1 | * | 1/2001 | Hirose et al. |

FOREIGN PATENT DOCUMENTS

| | | |
|---|---|---|
| JP | 6-254359 | 9/1994 |
| JP | 11-76776 | 3/1999 |

* cited by examiner

*Primary Examiner*—Ana Fortuna
(74) *Attorney, Agent, or Firm*—Morrison & Foerster, LLP

(57) ABSTRACT

The present invention relates to a composite semipermeable membrane which is characterized in that it is a composite semipermeable membrane in which there is formed by polycondensation on top of a microporous support membrane a crosslinked polyamide ultra-thin membrane layer from polyfunctional amine, polyfunctional acid halide and polyfunctional acid anhydride halide, and the flow of water permeate at an operating pressure of 0.3 MPa, a temperature of 25° C. and a pH of 6.5 lies in the range from 0.8 to 4.0 $m^3/m^2$.day and, furthermore, the percentage humic acid removal is at least 98%; a method for the production thereof; and a water purification method employing same. With the composite semipermeable membrane obtained by means of the present invention it is possible, in particular, to recover drinking water at a high rate by permitting passage of silica and preventing deposition thereof at the membrane surface while selectively separating/removing the pollutants and trace quantities of harmful materials and their precursors, etc, contained in the raw water in water treatment plants.

19 Claims, No Drawings

COMPOSITE SEMIPERMEABLE MEMBRANE, PROCESSFOR PRODUCING THE SAME, AND METHOD OF PURIFYING WATER WITH THE SAME

TECHNICAL FIELD

The present invention relates to a high-performance composite semipermeable membrane for selectively transmitting and separating the components of liquid mixtures, a method for the production thereof and a method of removing harmful substances using same. With the composite semipermeable membrane obtained by means of the present invention it is possible, in particular, to recover drinking water at a high rate by permitting passage of silica and preventing deposition thereof at the membrane surface while selectively separating/removing the pollutants and trace quantities of harmful substances and their precursors, etc, contained in the raw water of water treatment plants.

TECHNICAL BACKGROUND

In relation to the separation of mixtures, there are various techniques for removing materials (for example salts) dissolved in solvents (for example water) but, in recent years, membrane separation methods have come to be used as energy-saving and resource-efficient processes. The membranes in membrane separation methods are microfiltration membranes, ultrafiltration membranes and reverse osmosis membranes. Furthermore, recently, membranes positioned between reverse osmosis membranes and ultrafiltration membranes (loose RO membranes or NF membranes: nanofiltration membranes) have appeared and have come to be used. This technology makes it possible to obtain drinking water from, for example, sea water, salt/brackish water and water containing harmful substances and, moreover, the technology has also been employed for the production of ultra-pure water for industrial use, for waste water treatment and for the recovery of valuable materials, etc.

The majority of the composite semipermeable membranes currently marketed are of two kinds, namely those having a gel layer and an active layer of crosslinked polymer on top of a microporous support membrane and those having an active layer of polycondensed monomer on top of a microporous support membrane. Of these, composite semipermeable membranes formed by coating a microporous support membrane with an ultra-thin membrane layer of crosslinked polyamide obtained by a polycondensation reaction between a polyfunctional amine and a polyfunctional acid halide are widely employed as reverse osmosis membranes of high permeability and selective separation characteristics.

However, the demand for practical semipermeable membranes for reverse osmosis is increasing year by year and, from the point of view of energy-saving, there is desired a semipermeable membrane with high water permeability where lower pressure operation is possible while still maintaining high solute removal properties. For example, from JP-A-64-56108 there is known a composite semipermeable membrane having good desalting properties and high water permeability in ultra-low pressure operation at 7.5 kg/cm$^2$ (0.75 MPa), based on the presence of 4-chloroformylphthalic anhydride. However, even with this method the desalting properties and the water permeability are unsatisfactory in the case of super ultra-low pressure operation at around 0.3 MPa. Now, operation at a high recovery rate is also desirable, but with membranes where the percentage silica removal is high the silica concentration on the concentrate side increases rapidly, and deposition occurs at the membrane surface, so that a lowering of membrane performance results and stable operation and enhanced water quality cannot be expected.

In recent years, in water treatment plants using river water, and lake and swamp water, or the like, as the raw water, the formation of carcinogenic halogen-containing organic materials (trihalomethanes) has become a serious problem owing to the fact that in the water treatment plant there is carried out the chlorine sterilization treatment of the soluble organic matter (trihalomethane precursors) flowing-in from peat bogs and regions between mountains, etc. The most important of the trihalomethane precursors is humic acid, which comprises soluble organic matter of molecular weight ranging from several thousands to several tens of thousands. In the case of the ozone/active carbon treatment methods, the introduction of which is currently being investigated in water treatment plants, while the percentage removal at the time of the start of operation is high, when long-term operation is carried out the percentage removal falls rapidly. For this reason, frequent replacement of the active carbon is necessary. Furthermore, with contact oxidation methods, biological membrane methods and other such biological treatment methods, since soluble organic matter is formed at the end of the biological metabolism, there is the problem that sufficient removal cannot be carried out. In membrane separation methods, the microfiltration membrane and ultrafiltration membrane pore diameters are large and satisfactory removal of humic acid cannot be achieved. Furthermore, with reverse osmosis membranes, while the pore diameter is small and the percentage humic acid removal is high, the percentage silica removal is also high and consequently high-recovery operation using reverse osmosis membranes is difficult.

In order to resolve problems of the kind described above, the objective of the present invention lies in offering a composite semipermeable membrane having high solute removal properties and high water permeability, where high-recovery operation is possible.

DISCLOSURE OF THE INVENTION

In order to realize the aforesaid objective, the present invention relates to a composite semipermeable membrane which is characterized in that it is a composite semipermeable membrane in which there is formed by polycondensation, on a microporous support membrane, a crosslinked polyamide ultra-thin membrane layer from a polyfunctional amine, a polyfunctional acid halide and a polyfunctional acid anhydride halide, and the flow of water permeate at an operating pressure of 0.3 MPa, a temperature of 25° C. and a pH of 6.5 lies in the range from 0.8 to 4.0 m$^3$/m$^2$.day and, furthermore, the percentage humic acid removal is at least 98% and, preferably, a composite semipermeable membrane characterized in that the carboxyl group concentration in the ultra-thin membrane layer analyzed using X-ray photoelectron spectroscopy (ESCA) is at least 0.02 but less than 0.06: a method for the production thereof; and a method of water purification using same.

Optimum Form for Practising the Invention

The polyfunctional amine in the present invention is a mixed amine of aliphatic polyfunctional amine and aromatic polyfunctional amine, where the aliphatic polyfunctional amine is preferably a piperazine type amine or derivative thereof as represented by [Formula 1], examples being piperazine, 2,5-dimethylpiperazine, 2-methylpiperazine, 2,6-dimethylpiperazine, 2,3,5-trimethylpiperazine, 2,5-diethylpiperazine, 2,3,5-triethylpiperazine, 2-n-propylpiperazine, 2,5-di-n-butylpiperazine and the like, with in particular piperazine and 2,5-dimethylpiperazine being preferred.

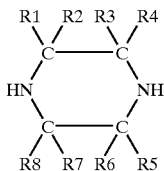

[Formula 1]

$R^1$ to $R^8$ are each selected from H, OH, COOH, $SO_3H$, $NH_2$ and $C_1$ to $C_4$ straight chain and cyclic, saturated and unsaturated, aliphatic groups.

Furthermore, the aromatic polyfunctional amine is not particularly restricted providing it has no less than two amino groups per molecule, and examples include m-phenylenediamine, p-phenylenediamine and 1,3,5-triaminobenzene, plus the N-alkyl derivatives thereof such as N,N-dimethyl-m-phenylenediamine, N,N-diethyl-m-phenylenediamine, N,N-dimethyl-p-phenylenediamine, N,N-diethyl-p-phenylenediamine and the like, with m-phenylenediamine and 1,3,5-triaminobenzene being particularly preferred.

The molar ratio of the aliphatic polyfunctional amine to the aromatic polyfunctional amine used in the present invention lies in the range from 40/60 to 95/5, more preferably from 70/30 to 90/10. If the aliphatic polyfunctional amine is less than 40 mol %, the flow of water permeate declines, while if it is greater than 95 mol % good selective separation characteristics are not obtained.

The polyfunctional acid halide is an acid halide having not less than two halocarbonyl groups per molecule and there are no particular restrictions thereon provided that a polyamide is formed by reaction with the aforesaid amine. As examples of the polyfunctional acid halides, there are the acid halides of 1,3,5-cyclohexanetricarboxylic acid, 1,3-cyclohexanedicarboxylic acid, 1,4-cyclohexanedicarboxylic acid, 1,3,5-benzenetricarboxylic acid, 1,2,4-benzenetricarboxylic acid, 1,3-benzenedicarboxylic acid and 1,4-benzenedicarboxylic acid. In particular, from the point of view of cost, ease of procurement, ease of handling and ease of reaction, trimesoyl chloride, which is the acid halide of 1,3,5-benzenetricarboxylic acid, is preferred. Furthermore, the aforementioned polyfunctional acid halides can be used on their own or they may be employed as mixtures.

The polyfunctional acid anhydride halide referred to is a compound having one or more than one acid anhydride moiety and one or more than one halocarbonyl group per molecule, and examples include the carbonyl halides of benzoic anhydride and phthalic anhydride but, in terms of high water permeability and a suitable pore size for eliminating soluble organic materials, trimellitic anhydride halide and derivatives thereof as represented by the following general formula [Formula 2] are preferably used.

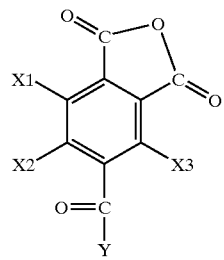

[Formula 2]

$X^1$ and $X^2$ are each selected from $C_1$ to $C_3$ straight chain and cyclic, saturated and unsaturated, aliphatic groups, H, OH, COOH, $SO_3H$, COF, COCl, COBr and COI, or they may form an acid anhydride, $X^3$ is selected from $C_1$ to $C_3$ straight chain and cyclic, saturated and unsaturated, aliphatic groups, H, OH, COOH, $SO_3H$, COF, COCl, COBr and COI, Y is selected from F, Cl, Br and I As the material for the ultra-thin membrane in the composite semipermeable membrane of the present invention, there can be used a crosslinked or linear organic polymer. In order that the composite semipermeable membrane of the present invention manifests high separation performance, a polyamide, polyurethane, polyether, polyester, polyimide, cellulose ester or vinyl polymer is preferred as the polymer, with polyamides being particularly preferred from amongst these. A crosslinked polyamide obtained by the reaction between a polyfunctional amine, a polyfunctional acid halide and a polyfunctional acid anhydride halide is further preferred.

The molar ratio of the polyfunctional acid halide to the polyfunctional acid anhydride halide used in the present invention is important in terms of obtaining a composite semipermeable membrane with the opposing properties of high water permeability and selective separation. The feed molar ratio of polyfunctional acid halide to polyfunctional acid anhydride halide is preferably from 75/25 to 15/85, and more preferably 65/35 to 35/65. If the molar proportion of polyfunctional acid anhydride halide falls below 25, then the flow of water permeate is reduced, while if it exceeds 85 then good selective separation is no longer obtained.

A preferred example of the microporous support membrane is a polysulfone support membrane which has been reinforced by a fabric. The microporous support membrane is a layer which essentially does not possess separation properties but is used to confer mechanical strength on the ultra-thin membrane layer which possesses the separation properties. A support membrane structure is preferred which has uniform microfine pores or which has microfine pores which gradually become larger from one side to the other and where the size of these microfine pores at the surface on this one side is no more than 100 nm. This microporous support membrane can be selected from various types of commercially-available material such as "Millipore Filter VSWP" (commercial name) made by the Millipore Co. and "Ultrafilter UK10" (commercial name) made by the Toyo Roshi Co., but normally it may be produced by the method described in the "Office of Saline Water Research and Development Progress Report" No. 359 (1968). The material used is normally a homopolymer such as polysulfone, cellulose acetate, cellulose nitrate or polyvinyl chloride, or a blend thereof, but the use of a polysulfone of high chemical, mechanical and thermal stability is preferred. For example, a dimethylformamide (DMF) solution of a polysulfone is cast to a given thickness onto a tightly-woven polyester fabric or onto nonwoven material and, by wet coagulation thereof in an aqueous solution containing, for example, 0.5 wt % sodium dodecylsulphate and 2 wt % DMF, a microporous support membrane having microfine pores of diameter no more than a few tens of nm over the greater part of the surface is obtained.

The carboxyl group concentration is the amount of carboxyl groups (moles) in terms of the total amount of carbon (moles) in the ultra-thin membrane layer, and it is given by the formula [3].

$$\text{Carboxyl group concentration} = \frac{\text{amount of carboxyl groups (moles)}}{\text{total carbon in ultra-thin membrane layer (moles)}} \quad [\text{Formula 3}]$$

The carboxyl group concentration can be determined using an X-ray photoelectron spectroscopy method (ESCA), employing the gas phase chemical modification method exemplified in *Journal of Polymer Science* Vol. 26, 559–572 (1988) and in Nihon Setchaku Gakkai-shi (J. Adhesion Soc. Japan) Vol. 27, No.4 (1991).

Below, a method of measuring the carboxyl group concentration is explained. As a labelling reagent for the carboxyl groups, trifluoroethanol is used. The sample is subjected to gas phase chemical modification by means of the labelling reagent and, from the ESCA spectrum of a polyacrylic acid standard sample which has undergone gas phase chemical modification at the same time, the percentage reaction (r) of the labelling reagent and the percentage reaction residue remaining (m) is obtained. Next, the peak area [F1s] of the F1s peak (fluorine 1s orbital peak) following reaction between the sample and the labelling reagent is obtained. Again, by elemental analysis, the area intensity [C1s] of the C1s peak (carbon 1s orbital peak) is obtained.

The measurement conditions are as follows:
excitation X-rays: Mg $K_\alpha$, 1,2 line (1253.6 eV)
X-ray output: 8 kV 30 mV
take-off angle: 90°

In the data processing, the C1s peak position for the neutral carbon ($CH_x$) is set to 284.6 eV.

By introducing the area intensities [F1s] and [C1s] obtained as described above into Formula [4] given in *Journal of Polymer Science* Vol.26 559–572 (1988), it is possible to obtain the carboxyl group concentration.

$$R_{COOH} = \frac{[F1s]}{(3k_{F1s}[C1s] - (2+13m)[F1s])r} \quad \text{Formula [4]}$$

$R_{COOH}$: carboxyl group concentration, [F1s]: area intensity of the fluorine 1s orbital peak, $k_{F1s}$: sensitivity correction for the fluorine 1s orbital peak, r: percentage reaction of the labelling reagent, [C1s]: area intensity of the carbon 1s orbital peak, m: residual percentage of the reaction residue When the carboxyl group concentration is high, there is an increase in the carboxyl group terminals in the membrane and the water permeability rises but the crosslink density is decreased and the harmful material removal properties are lowered. Conversely, when the carboxyl group concentration is low, there is a reduction in unreacted terminals and the crosslink density is increased, so the water permeability is lowered. Hence, the carboxyl group concentration should be at least 0.02 but less than 0.06, and preferably at least 0.02 and no more than 0.04. Now, the thickness of the ultra-thin membrane layer in the composite semipermeable membrane should be from 1 nm to 300 nm, and preferably from 1 nm to 100 nm. If the thickness of the ultra-thin membrane layer is too low, the occurrence of defects increases at the time of membrane production, damage readily occurs at the time of handling, and when pressure is applied faults are produced and a lowering of the removal rate is brought about. Furthermore, if the ultra-thin membrane layer is too thick, the permeability rate/coefficient is reduced and adequate permeation is not obtained.

The roughly spherical projections at the surface of the ultra-thin membrane layer are small projections of height 1 to 800 nm and diameter 1 to 500 nm, and they can be observed from a scanning electron micrograph or a transmission electron micrograph of the ultra-thin membrane layer surface or of a cross-section. Furthermore, by analysis of the electron micrograph, it is possible to determine the size of the individual roughly spherical projections and the distribution thereof. For example, in the case of a scanning electron microscope surface photomicrograph, the surface of the membrane sample is thinly coated with platinum or quaternized ruthenium, preferably quaternized ruthenium, and observation made at an acceleration voltage of 1 to 6 kV with a high resolution field emission scanning electron microscope (UHR-FE-SEM). As the high resolution field emission scanning electron microscope there can be used, for example, the model S-900 electron microscope made by Hitachi Ltd., or the like. The observation magnification is preferably 5,000 to 100,000 times, and in order to determine the size distribution of the roughly spherical projections a magnification of 10,000 to 50,000 times is preferred. Taking into account the magnification used, the size of the roughly spherical projections can be directly measured from the electron micrograph obtained by using a ruler or the like.

The roughly spherical projections in the present invention are the small projections of roughly spherical shape covering the ultra-thin membrane layer as seen in the electron micrograph of the composite semipermeable membrane surface, and the ratio of the major/minor axes thereof can be determined by the following method. As an example, a square of side 10 cm is drawn on a scanning electron micrograph of the membrane surface obtained at a magnification of 20,000. Next, with a ruler, the major and minor axes of the roughly spherical projections in the square are measured. In this way, it is possible to measure the major and minor axes of all the roughly spherical projections in the square and obtain the distribution thereof. Now, even where half or more of the roughly spherical projections in the aforesaid electron micrograph are obscured or where calculation is performed excluding those roughly spherical projections which, in terms of the shadowing, are below the observable limits, no problem arises, and the lower limit of the major axis is not particularly restricted but, preferably, it is about 50 nm. Furthermore, when only the upper semicircle of a roughly spherical projection can be seen in the aforesaid micrograph, by estimating the lower semicircle the roughly spherical projection can be traced out, the major and minor axes then measured and the ratio of the major/minor axes determined.

Furthermore, the ratio of the major/minor axes of the roughly spherical projections and the distribution thereof can also be obtained by image processing, by inputting the electron micrograph, or a trace of the roughly spherical projections obtained from the electron micrograph, into a computer. For example, calculation can be carried out with the image processing software "P'-Analyzer" using a "PIAS-IV" device produced by PIAS K.K. Furthermore, it is possible to calculate the distribution from all the roughly spherical projections recorded on the electron micrograph by means of such methods.

Roughly spherical projections (also referred to as pleated structures) have already been observed in composite membranes produced by the interfacial polycondensation method, and it is reported that the flow of water permeate is increased by the increase in surface area (Mutsuo Kawasaki, Takeshi Sasaki and Masahiko Hirose, *Maku,* 22(5), 257–263 (1997)) but, rather than being roughly spherical, the shapes thereof were kombu seaweed-shaped (that is, having a slightly wrinkled or pleated structure). As a result of considerable investigation, it has been discovered that roughly spherical projections where the ratio of the major axis/minor axis of these roughly spherical projections in the ultra-thin membrane layer is made to lie in the range 1.0 to 2.0 by adjustment of the monomer used and the film-forming conditions, are preferred in terms of enhancing the separation properties in the case of a composite semipermeable membrane used at low pressure. With regard to the distribution thereof, it is desirable that the roughly spherical projections where the ratio of the major/minor axes is 1.0 to 2.0 comprise at least 70%, and preferably at least 80%, of the roughly spherical projections as a whole. Where this distribution is less than 70%, the ultra-thin membrane layer is non-uniform so it is possible that the desired membrane properties will not be obtained or that variations in membrane performance are increased. Furthermore, where the ratio of the major/minor axes of the roughly spherical projections is more than 2.0, then, rather than roughly spherical projections, they become tubular or kombu seaweed-shaped. Contamination readily builds up in the gaps there-between and problems may arise in the pressure resistance when used at high pressure.

The provision of the ultra-thin membrane layer in the present invention can be carried out by the method of coating polymer, the method of further crosslinking polymer which has been coated, the method of polymerising monomer at the membrane surface of the microporous support membrane, or the method of carrying out interfacial polycondensation at the membrane surface of the microporous support membrane. In particular, the ultra-thin membrane layer referred to in the present invention, with projections at the surface the tips of which are roughly circular, can be obtained by the method of interfacial polycondensation at the membrane surface of the microporous support membrane. In such circumstances, it is possible to control the size of the roughly spherical projections by altering the solution concentrations or the additives used in the interfacial polycondensation. Again, using a hydrocarbon with 7 or more carbons as the water-immiscible solvent is effective for obtaining the ultra-thin membrane layer of the present invention. Next, the method of producing the composite semipermeable membrane is explained.

The ultra-thin membrane layer in the composite semipermeable membrane, which essentially possesses the separating properties, is formed by carrying out reaction on the aforesaid microporous support membrane between an aqueous solution containing the aforesaid amine and a water-immiscible organic solvent solution containing the aforesaid polyfunctional acid halide together with polyfunctional acid anhydride halide.

The molar ratio of the aliphatic polyfunctional amine to the aromatic polyfunctional amine used in the present invention is, as stated above, from 40/60 to 95/5, and more preferably from 70/30 to 90/10, and the concentration of the amine in the aqueous solution of mixed amine is from 0.1 to 20 wt %, preferably 0.5 to 15 wt %. Again, providing they do not obstruct the reaction between the amine compound and the polyfunctional acid halide plus the polyfunctional acid anhydride halide jointly present therewith, there may also optionally be present, in the aqueous solution and in the organic solvent solution, compounds such as an acylation catalyst, polar solvent, acid scavenger, surfactant, antioxidant and the like.

With regard to the covering of the microporous support membrane surface with the aqueous amine solution, said aqueous solution should be applied uniformly and continuously to the surface and this may be carried out by known application means such as, for example, the method of coating the aqueous solution onto the surface of the microporous. Next, the method of producing the composite semipermeable membrane is explained.

The ultra-thin membrane layer in the composite semipermeable membrane, which essentially possesses the separating properties, is formed by carrying out reaction on the aforesaid microporous support membrane between an aqueous solution containing the aforesaid amine and a water-immiscible organic solvent solution containing the aforesaid polyfunctional acid halide together with polyfunctional acid anhydride halide.

The molar ratio of the aliphatic polyfunctional amine to the aromatic polyfunctional amine used in the present invention is, as stated above, from 40/60 to 95/5, and more preferably from 70/30 to 90/10, and the concentration of the amine in the aqueous solution of mixed amine is from 0.1 to 20 wt %., preferably 0.5 to 15 wt %. Again, providing they do not obstruct the reaction between the amine compound and the polyfunctional acid halide plus the polyfunctional acid anhydride halide jointly present therewith, there may also optionally be present, in the aqueous solution and in the organic solvent solution, compounds such as an acylation catalyst, polar solvent, acid scavenger, surfactant, antioxidant and the like.

With regard to the covering of the microporous support membrane surface with the aqueous amine solution, said aqueous solution should be applied uniformly and continuously to the surface and this may be carried out by known application means such as, for example, the method of coating the aqueous solution onto the surface of the microporous support membrane or the method of immersing the microporous support membrane in said aqueous solution.

Next, the excess applied aqueous solution is eliminated by means of a liquid removal stage. The method used for this may be, for example, by holding the membrane surface vertically and allowing the liquid to run off naturally. Having removed the excess liquid, the membrane surface may then be dried, to eliminate some or all of the water from the aqueous solution. Next, there is applied the organic solvent solution of the polyfunctional acid halide in which the aforesaid polyfunctional acid anhydride halide is jointly present, so that there is formed by reaction an ultra-thin layer of crosslinked polyamide. The concentration of the polyfunctional acid halide is not particularly restricted, but if it is too low there is insufficient formation of the ultra-thin membrane which constitutes the active layer and there is the possibility of defects being produced, while if the concentration is too great this is disadvantageous in terms of cost. Hence, from about 0.01 to about 1.0 wt % is preferred. The method of effecting contact between said aqueous amine solution and the polyfunctional acid halide along with the jointly present polyfunctional acid anhydride halide may be the same as the method used for coating the microporous support membrane with the aqueous amine solution. Furthermore, the elimination of the organic solvent following the reaction can be carried out by the method of holding the membrane vertically, so that the excess non-polar solvent drains away naturally.

The organic solvent needs to be water-immiscible and, furthermore, needs to be capable of dissolving the polyfunctional acid halide, but without damaging the microporous support membrane and, providing that a crosslinked polymer can be formed by reaction, any such solvent may be used. Typical examples are liquid hydrocarbons and halohydrocarbons such as trichlorotrifluoroethane. However, taking into account potential damage to the ozone layer, ready availability, ease of handling and handling safety, octane, nonane, decane, undecane, dodecane, tridecane, tetradecane, heptadecane, hexadecane and the like, cyclooctane, ethylcyclohexane, 1-octene, 1-decene and other such individual solvents or mixtures thereof are preferably used.

The shape of the membrane may be either that of a hollow fibre or a flat membrane. The composite semipermeable membrane of the present invention can be used incorporated into a spiral, tubular or plate-and-frame module, but the invention is not restricted to these usage forms.

Using the composite semipermeable membrane of the present invention, harmful substances and the precursors thereof present in raw water can be removed at an operating pressure of 0.1 to 3.0 MPa. If the operating pressure is lowered, the capacity of the pump used is reduced and power consumption reduced but, on the other hand, the membrane tends to become blocked and the flow of water permeate is reduced. Conversely, if the operating pressure is increased, the power consumption is raised for the aforesaid reason, and the flow of water permeate is increased. Consequently, the operating pressure range is desirably 0.1 to 3.0 MPa, preferably 0.2 to 2.0 MPa and particularly 0.2 to 1.0 MPa. If the flow of water permeate is high, blockage is brought about due to fouling of the membrane face, while if it is low, costs are increased, so the range for the flow of water permeate is desirably 0.8 to 4.0 $m^3/m^2$.day and preferably 0.85 to 2.5 $m^3/m^2$.day in terms of maintaining a stable amount of water. Again, in order to reduce the water production costs and recover the supplied water efficiently, the recovery should be at least 80%, preferably at least 85% and more preferably at least 90%.

As examples of the harmful substances referred to here, there are trihalomethane precursors. Trihalomethane precursors produce carcinogenic trihalomethanes in the chlorine sterilization at a water purification plant. These trihalomethane precursors include humic acid and fulvic acid. In particular, the amount of trihalomethane produced is considerable with humic acid, and the percentage removal thereof should be at least 98% and more preferably at least 99%.

By using the composite semipermeable membrane of the present a invention, in the case of a silica concentration of 30 ppm as $SiO_2$ (which is the average value across Japan) the silica is allowed to pass and so it is possible to prevent the production of silica scale. With a membrane of low silica passage, when operation is conducted at a high percentage recovery the silica is deposited on the membrane face and blocks the membrane surface, so the problem arises that a high level of water passage is no longer obtained. Hence, the silica passage should be at least 55% and more preferably at least 65%.

By employing the means as described above, it is possible to obtain a composite semipermeable membrane having a high humic acid removal property and high water permeability not achievable in conventional microfiltration membranes, ultrafiltration membranes, reverse osmosis membranes and the like, and operation at a high percentage recovery is possible due to the high silica permeability.

EXAMPLES

Below, the present invention is explained in further detail by means of examples but the invention is not to be restricted in any way by these examples.

Now, the percentage removal and the percentage passage in the examples were determined by the following relationships.

percentage removal (%)={1−[(solute concentration in permeate liquid)/(solute concentration in feed liquid)]}×100 percentage passage (%)=[(solute concentration in permeate liquid)/(solute concentration in feed liquid)]×100

The maximum possible recovery was determined by solving the following simultaneous equations.

$$F=B+P \quad\quad\quad 1.$$

$$F \times C_f = B \times C_b + P \times C_p \quad\quad\quad 2.$$

$$\text{percentage elimination} = (1-C_p/C_f) \times 100 \quad\quad\quad 3.$$

$$\text{maximum possible recovery} = P/F \times 100 \quad\quad\quad 4.$$

Here, F is the flow rate of the feed liquid, B is the flow rate of the concentrate, P is the flow rate of the permeate, $C_f$ is the concentration of solute in the feed liquid, $C_b$ is the concentration of solute in the concentrate (120 ppm: saturated solution concentration of silica at 25° C., pH 6.5), and $C_p$ is the solute concentration in the permeate.

Furthermore, the water production capacity was obtained as the flow of water permeate ($m^3/m^2$.day), passing per unit area of membrane ($m^2$) per unit time (day).

Reference Example

The fibre reinforced polysulfone support membrane (ultrafiltration membrane) used in the invention was produced by the following procedure.

A polyester fibre taffeta (warp and weft both 150 denier multifilament yarns; weave density of warp yarn=90 per inch and weft yarn=67 per inch; thickness 160μ) of size 30 cm (length)×20 cm (width) was fixed to a glass plate, onto which was cast at room temperature (20° C.) a 15 wt % solution of polysulfone in dimethylformamide (DMF) to give a 200μ thickness, and by immediately immersing in pure water and leaving for 5 minutes there was produced the fibre reinforced polysulfone support membrane (hereinafter abbreviated to FR-PS support membrane). The water production capacity of the FR-PS support membrane (thickness 210–215μ) obtained in this way was 1.7 $m^3/m^2$.d measured at a pressure of 0.01 MPa and a temperature of 25° C. Furthermore, when an ultrafiltration test was carried out under the same. conditions, using 2 ppm humic acid adjusted to pH 6.5 as the raw water, the percentage humic acid removal was 60%. Moreover, when an ultrafiltration test was carried out under the same conditions as for the humic acid using, as the raw water, an aqueous solution in which $Na_2SiO_3.9H_2O$ had been dissolved at a concentration corresponding to 30 ppm as $SiO_2$, the percentage silica passage was 99.9%.

Comparative Example 1

The FR-PS support membrane produced in accordance with the Reference Example was immersed for 1 minute in a 3 wt % (total amine) aqueous solution of m-phenylenediamine/piperazine=20/80 (mole ratio). The support membrane was then slowly raised up in the vertical direction and, having eliminated the excess aqueous solution from the support membrane surface, there was applied, so as to completely wet the surface, a solution obtained by adding trimellitic anhydride chloride to a decane solution containing 0.06 wt % of trimesoyl chloride such that the trimesoyl chloride/trimellitic anhydride chloride mole ratio was 30/70, and left for 1 minute. Next, the membrane was placed vertically and the surplus solution allowed to drain off, after which drying was carried out by blowing air for 1 minute at 30° C. onto the membrane surface at a rate of 8 m/s to evaporate off the solvent remaining at the surface. The membrane was then immersed for 5 minutes in an aqueous solution comprising 1 wt % sodium carbonate and 0.3 wt % sodium dodecylsulphate and the reaction halted, after which thorough washing was performed with water. The membrane thus obtained was washed with hot water for 2 minutes at 70° C., after which it was immersed for 2 minutes in an aqueous solution of chlorine concentration 500 ppm and pH 7, following which it was stored in a 0.1 wt. sodium hydrogen sulphite aqueous solution.

When a reverse osmosis test was carried out on the composite semipermeable membrane thus obtained, under conditions of 0.3 MPa and 25° C. using 2 ppm humic acid adjusted to pH 6.5 as the raw water, the water production capacity was 0.96 $m^3/m^2$.d and the humic acid removal was 99.81%. Furthermore, when a reverse osmosis test was carried out under the same conditions as the humic acid using, as the raw water, an aqueous solution in which $Na_2SiO_3.9H_2O$ had been dissolved at a concentration corresponding to 30 ppm as $SiO_2$, the percentage silica passage was 31.8%. The maximum value of the operational recovery at this time was 81.5%.

When the carboxyl group concentration was determined by X-ray photoelectron spectroscopy (ESCA), it was 0.018.

Comparative Example 2

A composite semipermeable membrane was produced in the same way as in Comparative Example 1, except that the m-phenylenediamine/piperazine mole ratio in Comparative Example 1 was made 60/40, and there was added trimellitic anhydride chloride to the decane solution containing 0.06 wt % trimesoyl chloride until the trimesoyl chloride/trimellitic anhydride chloride mole ratio was 85/15. Using this composite semipermeable membrane, evaluation was carried out in the same way as in Comparative Example 1, and the evaluation results are shown in Table 1.

Comparative Example 3

A composite semipermeable membrane was produced in the same way as in Comparative Example 1, except that the m-phenylenediamine/piperazine mole ratio in Comparative Example 1 was made 60/40, and there was added trimellitic anhydride chloride to the decane solution containing 0.06 wt % trimesoyl chloride until the trimesoyl chloride/trimellitic anhydride chloride mole ratio was 10/90. Using this composite semipermeable membrane, evaluation was carried out in the same way as in Comparative Example 1, and the evaluation results are shown in Table 1.

EXAMPLE 1

A composite semipermeable membrane was produced in the same way as in Comparative Example 1, except that the m-phenylenediamine/piperazine mole ratio in Comparative Example 1 was made 15/85, and there was added trimellitic anhydride chloride to the decane solution containing 0.06 wt % trimesoyl chloride until the trimesoyl chloride/trimellitic anhydride chloride mole ratio was 50/50.

When a reverse osmosis test was carried out on the composite semipermeable membrane thus obtained, under conditions of 0.3 MPa and 25° C. using 2 ppm humic acid adjusted to pH 6.5 as the raw water, the water production capacity was 1.46 $m^3/m^2$.d and the percentage humic acid removal was 99.80%. Furthermore, when a reverse osmosis test was carried out under the same conditions as for the humic acid using, as the raw water, an aqueous solution in which $Na_2SiO_3.9H_2O$ had been dissolved at a concentration corresponding to 30 ppm as $SiO_2$, the percentage silica passage was 76.0%. When the maximum value of the operational recovery at this time was calculated, it was 92.6%.

Again, when the carboxyl group concentration was determined by X-ray photoelectron spectroscopy (ESCA), it was 0.022.

EXAMPLES 2 TO 5

Composite semipermeable membranes were produced as in Example 1, with the m-phenylenediamine/piperazine mole ratio and the trimesoyl chloride/trimellitic anhydride chloride mole ratio set at those shown in Table 1. Evaluation was performed in the same way as in Comparative Example 1 using these composite semipermeable membranes and the evaluation results are shown in Table 1.

INDUSTRIAL FIELD OF APPLICATION

By means of the present invention, it is possible to obtain a composite semipermeable membrane having high water permeability and, by using this composite semipermeable membrane, pollutants and trace harmful materials contained in raw water can be selectively removed and operation at high recovery levels becomes possible.

TABLE 1

| | m-PDA/PIP (mol ratio) | TMC/TMAC (mol ratio) | Flow of Water Permeate ($m^3/m^2 \cdot d$) | Percentage Humic Acid Removal (%) | Percentage $SiO_2$ Passage (%) | Recovery (%) | Operating Pressure (MPa) | Carboxyl Group Concentration |
|---|---|---|---|---|---|---|---|---|
| Comparative Example 1 | 20/80 | 30/70 | 0.96 | 99.81 | 31.8 | 81.5 | 0.3 | 0.018 |
| Comparative Example 2 | 60/40 | 85/15 | 0.62 | 99.72 | 51.3 | 86.0 | 0.3 | 0.017 |
| Comparative Example 3 | 60/40 | 10/90 | 4.05 | 99.05 | 88.3 | 96.3 | 0.3 | 0.018 |

TABLE 1-continued

|  | m-PDA/PIP (mol ratio) | TMC/TMAC (mol ratio) | Flow of Water Permeate (m³/m²·d) | Percentage Humic Acid Removal (%) | Percentage SiO₂ Passage (%) | Recovery (%) | Operating Pressure (MPa) | Carboxyl Group Concentration |
|---|---|---|---|---|---|---|---|---|
| Example 1 | 15/85 | 50/50 | 1.46 | 99.80 | 76.0 | 92.6 | 0.3 | 0.022 |
| Example 2 | 10/90 | 50/50 | 1.52 | 99.75 | 77.5 | 93.0 | 0.3 | 0.022 |
| Example 3 | 20/80 | 45/55 | 1.32 | 99.85 | 66.8 | 90.0 | 0.3 | 0.021 |
| Example 4 | 25/75 | 70/30 | 0.85 | 99.88 | 67.4 | 90.2 | 0.3 | 0.020 |
| Example 5 | 15/85 | 15/85 | 1.70 | 99.51 | 86.0 | 95.6 | 0.3 | 0.023 |

The symbols employed in the table have the following meanings.
m-PDA: m-phenylenediamine
PIP: piperazine
TMC: trimesoyl chloride
TMAC: trimellitic anhydride chloride

What is claimed is:

1. A composite semipermeable membrane, comprising a microporous support membrane and a membrane layer formed thereon by polycondensation, the membrane layer comprising a cross-linked polyamide ultra-thin membrane layer formed by polycondensation of a polyfunctional amine, a polyfunctional acid halide and a polyfunctional acid anhydride halide, the composite semipermeable membrane exhibiting a rate of flow of water permeate at an operating pressure of 0.3 MPa, a temperature of 25° C. and a pH of 6.5 in the range of from 0.8 to 4.0 m³/m².day and providing a percentage of humic acid removal of at least 98%, the ultra-thin membrane layer having a carboxyl group concentration analyzed using X-ray photoelectron spectroscopy (ESCA) of at least 0.02 but less than 0.06.

2. A composite semipermeable membrane according to claim 1, having a percentage of humic acid removal of at least 99%.

3. A composite semipermeable membrane according to claim 1 wherein the thickness of the ultra-thin membrane layer lies in the range from 1 nm to 300 nm.

4. A composite membrane according to claim 1, wherein the microporous support membrane is of at least one type selected from the group consisting of polysulfone, polyamide, polyester and vinyl polymer.

5. A composite semipermeable membrane according to claim 1, wherein, when evaluated by the circulation for 3 hours of an aqueous solution of silica concentration 30 ppm and pH 6.5 at an operating pressure of 0.3 MPa and a temperature of 25° C., the percentage silica passage is at least 55% and the flow of water permeate is at least 0.8 m³/m².day.

6. A composite semipermeable membrane according to claim 1, wherein the polyfunctional amine is a mixed amine comprising an aliphatic polyfunctional amine and an aromatic polyfunctional amine, the aliphatic polyfunctional amine is a piperazine type amine or derivative thereof represented by the following general formula (1) and the aromatic polyfunctional amine is an amine selected from the group consisting of m-phenylenediamine, p-phenylenediamine, 1,3,5-triaminobenzene and N-alkyl derivatives thereof,

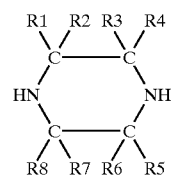

Formula (1)

wherein $R^1$ to $R^8$ are each selected from the group consisting of H, OH, COOH, SO₃H, NH₂, and $C_1$ to $C_4$ straight chain and cyclic, saturated or unsaturated, aliphatic groups.

7. A composite semipermeable membrane according to claim 1, wherein the polyfunctional acid halide is a polyfunctional acid chloride and the polyfunctional acid anhydride halide is a trimellitic acid anhydride halide or a derivative thereof represented by the following general formula (2),

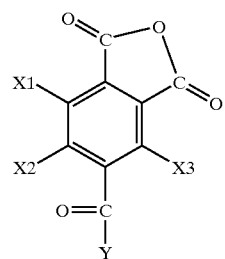

Formula (2)

wherein $X^1$ and $X^2$ are each selected from the group consisting of $C_1$ to $C_3$ straight chain and cyclic, saturated and unsaturated, aliphatic groups, H, OH, COOH, SO₃H, COF, COCl, COBr and COI, $X^3$ is selected from the group consisting of $C_1$ to $C_3$ straight chain and cyclic, saturated and unsaturated, aliphatic groups, H, OH, COOH, SO₃H, COF, COCl, COBr and COI, and Y is selected from the group consisting of F, Cl, Br and I.

8. A composite semipermeable membrane according to claim 1, wherein a surface of the ultra-thin membrane layer comprises projections with roughly spherical tips.

9. A composite semipermeable membrane according to claim 1, wherein, for at least 70% of the total number of the roughly spherical tips, the ratio of the major/minor axes of the tips viewed in a planar fashion lies in the range from 1.0 to 2.0.

10. A method of producing a composite semipermeable membrane, comprising:

providing a microporous support membrane; and forming a crosslinked polyamide ultra-thin membrane layer on the microporous support membrane by polycondensation thereon of a polyfunctional amine, a polyfunctional acid halide, and a polyfunctional acid anhydride halide, wherein the polyfunctional amine is a mixed amine comprising aliphatic polyfunctional amine and aromatic polyfunctional amine, where the aliphatic polyfunctional amine is a piperazine type amine or derivative thereof represented by the following general formula (1),

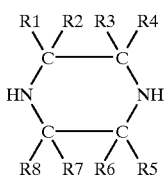

Formula (1)

wherein $R^1$ to $R^8$ are each selected from the group consisting of H, OH, COOH, $SO_3H$, $NH_2$ and $C_1$ to $C_4$ straight chain and cyclic, saturated or unsaturated, aliphatic groups, and the aromatic polyfunctional amine is an amine selected from m-phenylenediamine, p-phenylenediamine, 1,3,5-triaminobenzene and N-alkyl derivatives thereof, and wherein the composite semipermeable membrane exhibits a rate of flow of water permeate at an operating pressure of 0.3 MPa, a temperature of 25° C., and a pH of 6.5 in the range from 0.8 to 4.0 $m^3/m^2$ day and a percentage of humic acid removal of at least 98%, the ultra-thin membrane layer having a carboxyl group concentration analyzed using X-ray photoelectron spectroscopy (ESCA) of at least 0.02 but less than 0.06.

11. A method of producing the composite semipermeable membrane according to claim 10, wherein the microporous support membrane comprises a polymer selected from the group consisting of polysulfone, polyamide, polyester and vinyl polymer.

12. A method of producing the composite semipermeable membrane according to claim 10, wherein a molar ratio prior to polycondensation of aliphatic polyfunctional amine to aromatic polyfunctional amine lies in the range from 40/60 to 95/5.

13. A method of producing the composite semipermeable membrane according to claim 10, wherein a molar ratio prior to polycondensation of polyfunctional acid halide to polyfunctional acid anhydride halide lies in the range from 75/25 to 15/85.

14. A water purification method, comprising:

providing a composite semipermeable membrane comprising a microporous support membrane and a membrane layer formed thereon by polycondensation, the membrane layer comprising a cross-linked polyamide ultra-thin membrane layer formed by polycondensation of a polyfunctional amine, a polyfunctional acid halide and a polyfunctional acid anhydride halide, the composite semipermeable membrane exhibiting a rate of flow of water permeate at an operating pressure of 0.3 MPa, a temperature of 25° C. and a pH of 6.5 in the range of from 0.8 to 4.0 $m^3/m^2$.day and providing a percentage of humic acid removal of at least 98%, the ultra-thin membrane layer having a carboxyl group concentration analyzed using X-ray photoelectron spectroscopy (ESCA) of at least 0.02 but less than 0.06; and passing a water permeate in need of purification through the composite semipermeable membrane.

15. A water purification method according to claim 14, wherein the operating pressure lies in the range from 0.1 to 3.0 MPa.

16. A method of producing a composite semipermeable membrane, comprising:

providing a microporous support membrane; and forming a crosslinked polyamide ultra-thin membrane layer on the microporous support membrane by polycondensation thereon of a polyfunctional aliphatic or aromatic amine, a polyfunctional acid halide, and a polyfunctional acid anhydride halide, wherein the polyfunctional acid halide is a polyfunctional acid chloride and the polyfunctional acid anhydride halide is a trimellitic acid anhydride halide or derivative thereof represented by the following general formula 2,

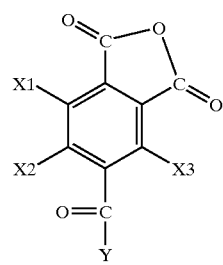

Formula (2)

wherein $X^1$ and $X^2$ are each selected from the group consisting of $C_1$ to $C_3$ straight chain and cyclic, saturated and unsaturated, aliphatic groups, H, OH, COOH, $SO_3H$, COF, COCl, COBr and COI, $X^3$ is selected from the group consisting of $C_1$ to $C_3$ straight chain and cyclic, saturated and unsaturated, aliphatic groups, H, OH, COOH, $SO_3H$, COF, COCl, COBr and COI, Y is selected from the group consisting of F, Cl, Br and I, and wherein the composite semipermeable membrane exhibits a rate of flow of water permeate at an operating pressure of 0.3 MPa, a temperature of 25° C., and a pH of 6.5 in the range from 0.8 to 4.0 $m^3/m^2$ day and a percentage of humic acid removal of at least 98%, the ultra-thin membrane layer having a carboxyl group concentration analyzed using X-ray photoelectron spectroscopy (ESCA) of at least 0.02 but less than 0.06.

17. A method of producing the composite semipermeable membrane according to claim 16, wherein the microporous support membrane comprises a polymer selected from the group consisting of polysulfone, polyamide, polyester, and vinyl polymer.

18. A method of producing the composite semipermeable membrane according to claim 16, wherein the introduced molar ratio of aliphatic polyfunctional amine to aromatic polyfunctional amine lies in the range from 40/60 to 95/5.

19. A method of producing the composite semipermeable membrane according to claim 16, wherein the introduced molar ratio of polyfunctional acid halide to polyfunctional acid anhydride halide lies in the range from 75/25 to 15/85.

* * * * *